United States Patent
Geibel et al.

(10) Patent No.: US 6,201,097 B1
(45) Date of Patent: Mar. 13, 2001

(54) PROCESS FOR PRODUCING POLY (ARYLENE SULFIDE)

(75) Inventors: Jon F. Geibel; Fernando C Vidaurri, Jr.; Glenn F. Kile, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/224,436

(22) Filed: Dec. 31, 1998

(51) Int. Cl.[7] ..................................... C08G 75/14
(52) U.S. Cl. ..................... 528/373; 528/374; 528/375; 528/487; 528/491; 528/492; 528/499; 528/501; 528/503
(58) Field of Search ..................... 528/375, 374, 528/487, 491, 492, 499, 501, 503, 378

(56) References Cited

U.S. PATENT DOCUMENTS

| | | | |
|---|---|---|---|
| 4,645,826 | 2/1987 | Iizuka et al. | 528/388 |
| 4,730,034 | 3/1988 | Nesheiwat et al. | 528/388 |
| 4,794,164 | 12/1988 | Iwasaki et al. | 528/388 |
| 4,910,294 | 3/1990 | Ogata et al. | 528/388 |
| 5,334,701 | 8/1994 | Ash et al. | 528/486 |
| 5,354,841 | 10/1994 | Geibel et al. | 528/388 |
| 5,384,391 | 1/1995 | Miyata et al. | 528/377 |

*Primary Examiner*—Duc Truong
(74) *Attorney, Agent, or Firm*—Polly C. Owen

(57) ABSTRACT

A novel treatment and recovery process is provided which produces commercially desirable high molecular weight poly(arylene sulfide)s from undesirable low molecular weight poly(arylene sulfide)s. The novel process reduces the quantity of low molecular weight poly(arylene sulfide)s which otherwise have little or no commercial value and can require disposal.

23 Claims, No Drawings

PROCESS FOR PRODUCING POLY (ARYLENE SULFIDE)

FIELD OF THE INVENTION

This invention relates to the field of processes for producing poly(arylene sulfide), hereinafter referred to as P(AS).

BACKGROUND OF THE INVENTION

The production of P(AS) for a variety of industrial and commercial uses has been known for some time. P(AS) is moldable into various articles including, but not limited to, parts, films, and fibers by means of, for example, injection molding and extrusion molding techniques. These articles have utility in a variety of applications where heat and chemical resistance properties are desired. For example, P(AS) can be utilized as a material for preparing electrical and electronic parts and automotive parts.

Generally, P(AS) is prepared by contacting reactants comprising a dihalogenated aromatic compound, a first polar organic compound, and a sulfur source under polymerization condition to produce a polymerization reaction mixture. In recovery of high molecular weight P(AS) product from the polymerization reaction mixture, a commercially unusable mixture remains. The high molecular weight P(AS) product is utilized for commercial purposes, as described above.

The recycle mixture comprises low molecular weight P(AS) and linear and cyclic P(AS) oligomers. The recycle mixture often is called "slime" due to its undesirable physical characteristics. Unfortunately, the recycle mixture, even though it comprises low molecular weight P(AS) and linear and cyclic P(AS) oligomers, has little or no commercial value. Thus, the recycle mixture often is disposed of in landfills or other disposal facilities.

There is a need in the P(AS) industry for a process to recover, recycle, and/or polymerize the recycle mixture to produce a high molecular weight P(AS).

SUMMARY OF THE INVENTION

It is an object of this invention to provide a more efficient process to produce P(AS) product.

It is another object of this invention to provide a process to utilize the recycle, commercially unusable, i.e., mixture to produce a commercially desirable second higher molecular weight P(AS) product.

In accordance with the present invention, a process is provided for producing a second high molecular weight P(AS) product, said process comprising the steps of:

1) removing a majority of a first high molecular weight poly(arylene sulfide) product from a polymerization reaction mixture and recovering a recycle mixture;
   wherein said polymerization reaction mixture comprises said first high molecular weight poly(arylene sulfide) product, low molecular weight poly(arylene sulfide), cyclic and linear poly(arylene sulfide) oligomers, at least one first polar organic compound, at least one first promoter compound, an alkali metal by-product, reactants, and water; and
wherein said recycle mixture comprises:
   (a) low molecular weight poly(arylene sulfide);
   (b) cyclic poly(arylene sulfide) oligomers of the formula

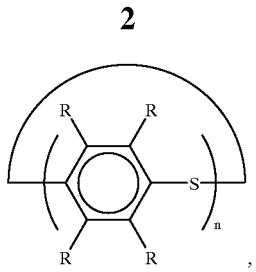

where $4 \leq n \leq 30$;
wherein R is selected from the group consisting of hydrogen, alkyl, cycloalkyl, aryl, alkylaryl, and arylalkyl radicals having from about 6 to about 24 carbon atoms.
   (c) linear poly(arylene sulfide) oligomers of the formula

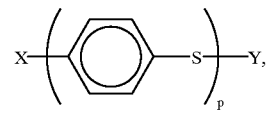

where $1 \leq p \leq 50$, and X and Y are independently selected from the group consisting of a hydrogen atom; a halogen atom; a phenoxy group; a halogenated phenyl group; a hydroxy group and the salts thereof; a cyclic amide; mercaptan groups and the salts thereof; substituted and unsubstituted amines of the formula

where $R^1$ and $R^2$ are selected from the group consisting of a hydrogen atom, an alkyl group having from 1 to 10 carbon atoms, a carboxylic acid having from 1 to 10 carbon atoms and a carboxylate having from 1 to 10 carbon atoms;

2) forming a two phase recycle mixture by a method selected from the group consisting of a) maintaining sufficient first polar organic compound and first promoter compound in said recycle mixture and b) adding sufficient second polar organic compound and second promoter compound to said recycle mixture;

3) heating said two phase recycle mixture to produce a recycle product reaction mixture;

4) recovering a second high molecular weight poly (arylene sulfide) product from said recycle product reaction mixture.

These objects and other objects of this invention will become more apparent with reference to the following.

DETAILED DESCRIPTION OF THE INVENTION

Different embodiments of this invention provide processes for producing a second high molecular weight poly (arylene sulfide) product. In a first embodiment of this invention, step 1 comprises removing a majority of a first high molecular weight P(AS) product from a polymerization mixture and recovering a recycle mixture. As used herein, the term "high molecular weight" or "high molecular weight P(AS)" means all P(AS) having molecular weights high enough to be commercially desirable and useable in an uncured state. Generally, the melt flow of a high molecular weight P(AS) usually is less than about 3,000 g/10 min., as disclosed in U.S. Pat. No. 5,334,701, herein incorporated by reference.

The polymerization reaction mixture comprises a first high molecular weight P(AS) product, low molecular weight P(AS), cyclic and linear P(AS) oligomers, at least one first polar organic compound, at least one first promoter compound, an alkali metal halide by-product, reactants, and water. As used herein, the term "low molecular weight" or "low molecular weight P(AS)" means all P(AS) having molecular weights low enough to be commercially undesirable and not useable in an uncured state. Generally, the melt flow of a low molecular weight P(AS) usually is greater than about 3,000 g/10 min., as disclosed in U.S. Pat. No. 5,334,701, previously incorporated by reference. Polymerization reaction mixtures useful in this invention can be produced by any method known to those of ordinary skill in the art. Examples of the polymerization reaction mixtures useful in this invention are those prepared according to U.S. Pat. Nos. 3,919,177, 3,354,129, 4,038,261, 4,038,262, 4,116,947, 4,282,347 and 4,350,810, all herein incorporated by reference.

Generally, polymerization reaction mixtures are prepared by contacting reactants comprising a dihalogenated aromatic compound, at least one first polar organic compound, at least one sulfur source, at least one base, and at least one first promoter compound under polymerization conditions.

Reaction mixtures that can be treated by the processes of this invention also include those in which components of the reaction mixture are premixed to form complexes before all of the components are brought together under polymerization conditions.

Dihalogenated aromatic compounds suitable for producing said polymerization reaction mixture can be represented by the formula

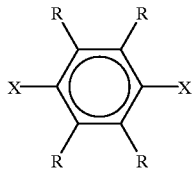

wherein X is a halogen, and R is selected from the group consisting of hydrogen, alkyl, cycloalkyl, aryl, alkylaryl, and arylalkyl radicals having from about 6 to about 24 carbon atoms. Exemplary dihalogenated aromatic compounds include, but are not limited to, and are selected from the group consisting of p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-5-(3-methylcyclopentyl)-2,5-dichlorobenzene, and mixtures thereof. The preferred dihalogenated aromatic compound for use in this invention is p-dichlorobenzene, hereinafter referred to as DCB, due to availability, ease of use, and high polymerization productivity.

At least one first polar organic compound is utilized to produce the polymerization mixture. First polar organic compounds include, but are not limited to, cyclic or acyclic organic amides having from about 1 to about 10 carbon atoms per molecule. Exemplary first polar organic compounds are selected from the group consisting of 1,3-dimethyl-2-imidazolidinone, formamide, acetamide, N-methylformamide, N,N-dimethylformamide, N,N-dimethylacetamide, N-ethylpropionanide, N,N-dipropylbutyramide, 2-pyrrolidone, N-methyl-2-pyrrolidone (NMP), ε-caprolactam, N-methyl-ε-caprolactam, N,N'-ethylenedi-2-pyrrolidone, hexamethylphosphoramide, tetramethylurea, and mixtures thereof. The preferred first polar organic compound for use in producing said polymerization reaction mixture is NMP due to availability and ease of use.

Any suitable source of sulfur can be used to produce said polymerization reaction mixture. Exemplary sources of sulfur are selected from the group consisting of thiosulfates, substituted and unsubstituted thioureas, cyclic and acyclic thioamides, thiocarbamates, thiocarbonates, trithiocarbonates, organic sulfur-containing compounds selected from mercaptans, mercaptides and sulfides, hydrogen sulfide, phosphorous pentasulfide, carbon disulfides and carbon oxysulfides, and alkali metal sulfides and bisulfides, and mixtures thereof. It generally is preferred to use an alkali metal bisulfide as a source of sulfur wherein the alkali metal is selected from the group consisting of sodium, potassium, lithium, rubidium, and cesium due to availability and ease of use. The preferred alkali metal bisulfide is sodium bisulfide (NaSH) due to availability and low cost.

Suitable bases to produce said polymerization reaction mixture are alkali metal hydroxides selected from the group consisting of lithium hydroxide, sodium hydroxide, potassium hydroxide, rubidium hydroxide, cesium hydroxide, and mixtures thereof. If desired, the base can be produced in-situ by reaction of the corresponding oxide with water. The preferred base is sodium hydroxide (NaOH) due to availability and ease of use.

At least one first promoter compound is utilized to produce said polymerization reaction mixture. Said first promoter compound is selected from the group consisting of alkali metal carboxylates, alkali metal halides which are soluble in the polar organic compound, water, and mixtures thereof. The use of a first promoter compound in the production of high molecular weight P(AS) product is disclosed in U.S. Pat. No. 5,334,701, previously incorporated by reference.

Alkali metal carboxylate promoter compounds can be represented by the formula $R^3$-COOM, where $R^3$ of the promotor is a hydrocarbyl radical having from 1 to about 20 carbon atoms and is selected from the group consisting of alkyl, cycloalkyl, and aryl and combinations thereof such as alkylaryl, alkylcyclcoalkyl, cycloalkylalkyl, arylalkyl, arylcycloalkyl, alkylarylalkyl and alkylcycloalkylalkyl, and M is an alkali metal selected from the group consisting of lithium, sodium, potassium, rubidium and cesium. Preferably, in order to have a more efficient polymerization reaction, $^3$ is an alkyl radical having from 1 to about 6 carbon atoms or a phenyl radical, and M is lithium or sodium. If desired, the alkali metal carboxylate promoter compound can be employed as a hydrate or as a solution or dispersion in water. If desired, the alkali metal carboxylate promoter compound can be produced in-situ by a reaction of the corresponding carboxylic acid and an alkali metal hydroxide or carbonate. Suitable alkali metal carboxylate promoter compounds which can be employed to produce said polymerization reaction mixture are selected from the group consisting of lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof. The preferred alkali metal carboxylate promoter compound for use in this invention is sodium acetate (NaOAc) due to availability, low cost, and effectiveness.

Alkali metal halide promoter compounds useful in this invention are those which are soluble in the first polar organic compound or can be made soluble in a mixture of the first polar organic compound and another promoter compound. For example, lithium chloride is useful as the first promoter compound, since it is soluble in certain polar organic compounds, such as, for example, NMP.

The temperature at which the polymerization reaction can be conducted can vary over a wide range. Generally, the temperature is within a range of from about 150° C. to about 375° C. and preferably from 200° C. to 285° C. The reaction time usually is within a range of from about 10 minutes to about 3 days and preferably 1 hour to 8 hours. The pressure need be only sufficient to maintain the dihalogenated aromatic compound and the first polar organic compound substantially in a liquid phase, and to retain the sulfur source therein.

At the termination of the polymerization reaction, the polymerization reaction mixture comprises the first high molecular weight P(AS) product, low molecular weight P(AS), cyclic and linear P(AS) oligomers, at least one first polar organic compound, at least one first promoter compound, the alkali metal by-product, reactants, and water. The polymerization reaction mixture is in a substantially liquid form at reaction temperatures. Alkali metal halide by-product is present as a precipitate.

A majority of said first high molecular weight P(AS) product is removed from said polymerization reaction mixture and a commercially undesirable, or recycle mixture is recovered. Said first high molecular weight P(AS) product can be removed from said polymerization reaction mixture by any means known to those skilled in the art, in order to recover the recycle mixture.

The recycle reaction mixture comprises low molecular weight poly(arylene sulfide) and cyclic and linear poly(arylene sulfide) oligomers. The poly(arylene sulfide) contained in the recycle mixture is of lower molecular weight than the molecular weight of said first high molecular weight P(AS) product resulting from a polymerization process. Generally, the low molecular weight P(AS) would have a low enough molecular weight that its inclusion in the first high molecular weight P(AS) product from which it was separated would detrimentally effect the properties of high molecular weight P(AS) product. Preferably, the low molecular weight P(AS) contained in said recycle mixture has extrusion rates and melt flow rates which are at least 50% greater than those of the first high molecular weight P(AS) product from which it was removed, when measured according to ASTM D 1238, Condition 316/0.345 and Condition 316/5, respectively.

The cyclic oligomers contained in the recycle mixture have a formula:

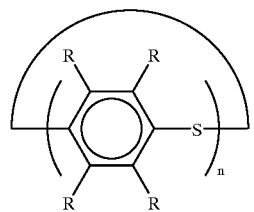

where $4 \leq n \leq 30$;

wherein R is selected from the group consisting of hydrogen, alkyl, cycloalkyl, aryl, alkylaryl, and arylalkyl radicals having from about 6 to about 24 carbon atoms.

Linear oligomers contained in the recycle mixture generally have the formula:

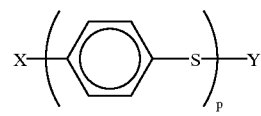

where $1 \leq p \leq 50$, where X and Y are end-groups occurring as by-products of the polymerization. End groups that will typically be present are hydrogen atoms; halogen atoms; a halogenated phenyl group; thiols and the salts thereof; phenoxy groups; hydroxyls and the salts thereof; mercaptan groups and the salts thereof; and cyclic amides groups and substituted and unsubstituted amines of the formula

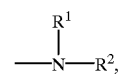

where $R^1$ and $R^2$ are selected from hydrogen, alkyl groups having 1–10 carbon atoms and carboxylic acids having from 1 to 10 carbon atoms and the salts thereof.

The recycle mixture can also contain other components, such as, for example, said first polar organic compounds, said first promoter compounds, dihalogenated aromatic compounds, alkali metal halide by-product, and various contaminants introduced during a poly(arylene sulfide) polymerization or recovery.

In one embodiment of this invention, said recycle mixture can be prepared by lowering the temperature of said polymerization reaction mixture to solidify said high molecular weight P(AS) product, said low molecular weight P(AS), and the cyclic and linear P(AS) oligomers. Then, said high molecular weight P(AS) product is removed by any means known to those of ordinary skilled in the art. For instance, said high molecular weight P(AS) product can be removed by screening through a sieve having a mesh of an appropriate size to recover the recycle mixture.

In another embodiment of this invention, said recycle mixture is prepared by forming a two phase polymerization reaction mixture by a method selected from the group consisting of maintaining sufficient first polar organic compound and first promoter compound in said polymerization reaction mixture or adding sufficient second polar organic compound and second promoter compound to said polymerization reaction mixture.

Said two phase polymerization reaction mixture comprises a more dense polymer-rich liquid phase, hereinafter referred to as a "lower phase" and a less dense polymer-lean liquid phase, hereinafter referred to as an "upper phase". Said lower phase comprises essentially all of the high molecular weight P(AS) product and a portion, preferably a small portion, of said lower molecular weight P(AS) and cyclic and linear P(AS) oligomers. Said upper phase comprises the remainder of the lower molecular weight P(AS) and cyclic and linear P(AS) oligomers. Said upper phase can be recovered and utilized as said recycle mixture.

To form the two phase polymerization reaction mixture, sufficient first polar organic compound and first promoter compound must be maintained in said polymerization reaction mixture or sufficient second polar organic compound and second promoter compound must be added.

The amount of the first polar organic compound maintained in the polymerization reaction mixture or the amount of said second polar organic compound added to form the two phase polymerization reaction mixture must be sufficient to result in the formation of a solution. In other words, enough first polar organic compound must be maintained or enough second polar organic compound must be added to allow the high molecular weight P(AS) product, low molecular weight P(AS), and cyclic and linear P(AS) oligomers to dissolve. Generally, this total amount is within a range of about 2 moles to about 25 moles of said first and/or second polar organic compounds per mole of sulfur in the high molecular weight P(AS) product.

If water is employed as the promoter compound, the amount of water to be maintained in the polymerization reaction mixture or added to form a two phase polymerization reaction mixture depends on various factors. These factors include, but are not limited to, the molecular weight of the polymerization reaction mixture, the temperature of the reaction mixture, the concentration of the high molecular weight P(AS) product, and the presence or absence of other promoter compounds. Broadly speaking, the amount of water as said promoter compound to be maintained or added is in the range of about 0.2 to about 10 moles of water per mole of sulfur in the high molecular weight P(AS) product.

Alkali metal carboxylate promoter compounds that can be employed as said promoter compounds can be the same as those previously discussed in this disclosure. While any amount of alkali metal carboxylate promoter compounds can be used that is sufficient to promote the formation of said the two phase polymerization reaction mixture, an amount within the range of about 0.01 to about 2 moles of alkali metal carboxylate promoter compound per mole of sulfur in the high molecular weight P(AS) product generally will be used when the alkali metal carboxylate promoter compound is employed with water. When certain alkali metal carboxylate promoter compounds are employed without water, the amount employed also generally will be in the range of about 0.01 to about 2 moles of alkali metal carboxylate promoter compound per mole of sulfur in the high molecular weight P(AS) product.

Alkali metal halide promoter compounds useful in this invention are those which are soluble in the first and second polar organic compound or can be made soluble in a mixture of the first and/or second polar organic compound and another promoter compound. For example, lithium chloride is useful as a promoter compound since it is soluble in certain first and second polar organic compounds, such as, for example, NMP. In contrast, sodium chloride, when placed in NMP, is insoluble and thus not useful by itself as a promoter compound.

The formation of the two phase reaction mixture can be affected by temperature. While higher temperatures aid in the dissolution of solid P(AS) polymer in the polar organic compound, lower temperatures appear to aid in formation of the two phase polymerization reaction mixture. The temperature should remain below that at which the first and second polar organic compounds, first and second promoter compounds, high molecular weight P(AS) product, low molecular weight P(AS), and cyclic and linear P(AS) oligomers decompose or vaporize, at the pressure employed. Generally, temperatures in the range of about 200° C. to about 300° C., preferably 220° C. to 270° C. are employed.

Said lower phase comprises essentially all of the higher molecular weight P(AS) fraction and a portion of the lower molecular weight P(AS) fraction and P(AS) oligomers. The upper phase comprises the remainder of the lower molecular weight fraction, and cyclic and linear P(AS) oligomers. Theoretically, the upper phase should not comprise any high molecular weight P(AS); however, in practice the upper phase can further comprise a portion of said high molecular weight P(AS) product from the lower phase. The upper phase can be utilized as the recycle mixture in this invention.

The upper phase can be removed from said lower phase by any method known to those of ordinary skill in the art. For example, the lower phase can be separated from the upper phase in a mixer-settler apparatus including a means for detecting the boundary between the lower and upper phases based on viscosity or density, with a port for removing the desired phase. In order to aid separation of the lower and upper phases, it is preferred that the reaction mixture is quiescent.

Step 2 of this separation method is to form a two phase recycle mixture by a method selected from the group consisting of maintaining sufficient first polar organic compound and first promoter compound in said recycle mixture or adding sufficient second polar organic compound and second promoter to said recycle mixture. This step is the same as previously discussed to produce a two phase polymerization reaction mixture.

To form the two phase recycle mixture, sufficient first polar organic compound and first promoter compound must be maintained in said recycle mixture or sufficient second polar organic compound and second promoter compound must be added. The amount of the first polar organic compound maintained in the recycle mixture or the amount of said second polar organic compound has been described above. If water is employed as the promoter compound, the amount of water to be maintained in the recycle mixture or added to form a two phase recycle mixture is as described above. Alkali metal carboxylate promoter compounds that can be employed as said promoter compounds can be the same as those previously discussed in this disclosure. The amount of alkali metal carboxylate promoter compounds that used that is that which is sufficient to promote the formation of the two phase recycle mixture described above. Alkali metal halide promoter compounds useful in this invention are those described previously.

The formation of the two phase recycle mixture can be affected by temperature. While higher temperatures aid in the dissolution of solid P(AS) polymer in the polar organic compound, lower temperatures appear to aid in formation of the two phase recycle mixture. The temperature should remain below that at which the first and second polar organic compounds, first and second promoter compounds, high molecular weight P(AS) product, low molecular weight P(AS), and cyclic and linear P(AS) oligomers decompose or vaporize, at the pressure employed. Generally, temperatures in the range of about 200° C. to about 300° C., preferably 220° C. to 270° C. are employed.

Step 3 comprises heating the two phase recycle mixture to produce a second high molecular weight P(AS) product. The two phase recycle mixture is heated to a temperature in a range of about 240° C. to about 270° C., preferably, in the range of about 240° C. to about 265° C., in order to produce larger quantities of the second high molecular weight P(AS) product.

Step 4 comprises recovering the second high molecular weight poly(arylene sulfide) product. This recovery can be by any means known to those of ordinary skill in the art. For example, said second high molecular weight P(AS) product can be recovered by a filtering and/or centrifuge system.

Surprisingly, it has been found that attempting to recycle the resultant "second-generation slime", or "second slime" after recovering the second high molecular weight P(AS) does not work. No useable high molecular weight P(AS) can be produced using the methods taught in this invention.

EXAMPLES

The following examples are provided to be illustrative of the invention but are not meant to be construed as limiting the reasonable scope of the invention.

Feedstock Preparation

A two phase polymerization reaction mixture produced by a polyphenylene sulfide (PPS) process, was cooled to produce a slurry of solids in a liquid and then screened through a 80 mesh screen U.S. Sieve (0.0070 inch openings) to separate the solids in the lower phase from the solids in the upper phase. Essentially all of the lower phase solids were retained on the screen. The upper phase solids and any lower phase solids not retained by the screen flowed through the screen to produce a recycle mixture (Feedstock One).

The recycle mixture (Feedstock One) was filtered using a Buechner finnel and filter paper to remove a majority of the first polar organic compound, second polar organic compound, first promoter compound, second promoter compound, water, and any other soluble components to produce Feedstock Two. Essentially all high molecular weight polyphenylenesulfide) (PPS) product should have been removed by screening through the 80 mesh screen. Feedstock Two had the appearance of a gray sludge.

Feedstock Three was produced by water washing and then drying Feedstock One in a vacuum oven at about 80° C. Feedstock Three was characterized by a melt flow index of 3300 g/10 minutes.

Recycled NMP—was obtained by fractional distillation of NMP recycled from previous polymerizations. Lower boiling components, i.e., water and DCB, were distilled away. Then, NMP was distilled from higher boiling components, i.e., oligomeric PPS.

Analytical Methods

Melt flow rates were determined by the method of ASTM D 1238-86, Procedure B—Automatically Timed Flow Rate Procedure, Condition 31615.0 modified to use a 5 minute preheat time, with the values of flow rate expressed in units of grams per ten minutes (g/10 min). Melt flow index is indicative of the molecular weight of the polymer with a low melt flow index indicating a high molecular weight.

Percent conversion of a particular feedstock to high molecular weight PPS was calculated by dividing the grams of high molecular weight PPS produced by the grams of feedstock utilized and then multiplying by 100.

Experimental Procedures

Varying amounts of anhydrous sodium acetate, water, NMP, and DCB were placed into a reactor with each different feedstock to form a two phase recycle mixture. The reactor was de-oxygenated by conducting 5 pressure and release cycles of 50 psig of nitrogen and then 5 cycles of 200 psig of nitrogen. The reactor was heated to a temperature ranging from 235° C. about 270° C. and held for a time of up to 6 hours to produce the second high molecular weight PPS product. After holding the reaction mixture for the prescribed time and temperature, cooling was accomplished by turning the power to the heater off. Stirring of the two phase recycle mixture continued at 475 rpm until a temperature of 220° C. was reached, then the agitator was turned off. The heater was removed from the reactor when the temperature of the two phase recycle mixture reached 150° C. The second high molecular weight PPS product produced and second generation slime ("second slime") mixture were separated as described above. The second high molecular weight PPS was water-washed. Weights (mass) of the dried second high molecular weight PPS product granules and second slime were obtained.

Example 1

The purpose of these experiments was to determine if additional DCB was required to produce the second high molecular weight PPS product from the two phase recycle mixture. Table 1 shows the results of this experiment.

TABLE 1

| Run # | Feedstock Three (g) | NaOAc Added (moles) | $H_2O$ Added (moles) | NMP Added (moles) | DCB Added (g) | Temp. (° C.) | Hold Time (hr) | Second Slime (g) | High Mol. Wt. PPS Product Produced (g) | Melt Index (g/10 min) | Conversion (%) |
|---|---|---|---|---|---|---|---|---|---|---|---|
| 100 | 42.87 | 1 | 1.586 | 4.756 (R) | 1.18 | 260 | 2 | 8.78 | 28.5 | 120 | 66.5 |
| 110 | 42.87 | 1 | 1.586 | 4.756 (R) | 0 | 260 | 2 | 9.44 | 34.48 | 330 | 80 |
| 120 | 42.87 | 1 | 1.586 | 4.756 (V) | 1.18 | 260 | 2 | 6.35 | 32.43 | 200 | 75.6 |
| 150 | 42.87 | 0.5 | 1.586 | 4.756 (V) | 0 | 260 | 2 | 11.06 | 27.82 | 190 | 64.9 |

(R) - Recycled NMP
(V) - "Virgin" NMP - used as received from Fisher Scientific Co.

From these data, it is shown that there is no requirement to add excess DCB to produce the second high molecular weight PPS product from said two phase reaction mixture. Run 110 has a much higher melt flow rate (melt index), probably due to the high yield (80%). The high yield likely is due to some slime being included in the high molecular weight product, which probably is a result of a poor physical separation of the two phases.

Example 2

The purpose of this experiment was to determine if virgin NMP can be used in the process of converting Feedstock Three into said second high molecular weight PPS product. The results of this experiment are shown in Table 2.

TABLE 2

| Run # | Feedstock Three (g) | NaOAc Added (moles) | H₂O Added (moles) | NMP Added (moles) | DCB Added (g) | Temp. (° C.) | Hold Time (hr) | Second Slime (g) | High Mol. Wt. PPS Product Produced (g) | Melt Index (g/10 min) | Conversion (%) |
|---|---|---|---|---|---|---|---|---|---|---|---|
| 100 | 42.87 | 1 | 1.586 | 4.756 (R) | 1.18 | 260 | 2 | 8.78 | 28.5 | 120 | 66.5 |
| 120 | 42.87 | 1 | 1.586 | 4.756 (V) | 1.18 | 260 | 2 | 6.35 | 32.43 | 200 | 75.6 |

(R) - Recycled NMP
(V) - Virgin NMP

These data indicate that the use of recycle or virgin NMP does not affect the production of the second high molecular weight PPS product from said Feedstock Three. This is another instance of yield and melt flow rates being a trade-off. Add a small amount of slime into the high molecular weight PPS product granules and the yield increases, but the melt flow rate increases, too.

Example 3

The purpose of this experiment was to determine if a reduction in the amount of sodium acetate can effect the amount and melt flow index of the second high molecular weight PPS product produced.

sufficient first promoter compound or by adding sufficient second promoter compound, additional first and/or second promoter compound is not required to produce the second high molecular weight PPS product.

Example 4

The purpose of Run 160 was to determine if Feedstock Two can be converted into said second high molecular weight PPS product. Feedstock Two is a recycle mixture that has been filtered but not water washed to remove sodium chloride and sodium acetate. Table 4 shows the results of this experiment.

TABLE 3

| Run # | Feedstock Three (g) | NaOAc Added (moles) | H₂O Added (moles) | NMP Added (moles) | p-DCB Added (g) | Temp. (° C.) | Hold Time (hr) | Second Slime (g) | High Molecular Weight PPS Product Produced (g) | Melt Index (g/10 min) | Conversion (%) |
|---|---|---|---|---|---|---|---|---|---|---|---|
| 130 | 42.87 | 0.5 | 1.586 | 4.756 (R) | 1.18 | 260 | 2 | 11.43 | 28.5 | 170 | 67 |
| 140 | 42.87 | 0.25 | 1.586 | 4.756 (R) | 1.18 | 260 | 2 | 14.15 | 26.84 | 140 | 62.6 |

(R) - Recycled NMP

From these data, reducing the amount of sodium acetate does not have an effect on the melt flow index of the second high molecular weight PPS product produced. Therefore, if two phase conditions are present, either by maintaining

TABLE 4

| Run # | Feedstock Two (g) | NaOAc Added (moles) | H₂O Added (moles) | NMP Added (moles) | p-DCB Added (g) | Temp. (° C.) | Hold Time (hr) | Second Slime (g) | High Mol. Wt. PPS Product Produced (g) | Melt Index (g/10 min) |
|---|---|---|---|---|---|---|---|---|---|---|
| 160 | 301 | 0 | 1.586 | 2.727 (V) | 1.18 | 260 | 2 | 9.44 | 13.3 | 50 |

(V) - Virgin NMP

Conversion for this example was calculated by determining the amount of second high molecular weight PPS product produced and dividing that by the sum of second slime and second high molecular weight PPS products, because the starting material was Feedstock Two. Thus, percent conversion for Run 160, based on this described calculation, was 58.5%. These data indicate that sodium chloride and sodium acetate can remain in the two phase recycle mixture without interfering in the production of said second high molecular weight PPS product.

Example 5

The purpose of Run 170 was to determine if Feedstock 1 can be utilized to product said second high molecular weight PPS products. Table 5 shows the results of this experiment.

TABLE 5

| Run # | Feedstock One (g) | NaOAc Added (moles) | H$_2$O Added (moles) | NMP Added (moles) | p-DCB Added (g) | Temp. (° C.) | Hold Time (hr) | Second Slime (g) | High Mol. Wt. PPS Product Produced (g) | Melt Index (g/10 min) |
|---|---|---|---|---|---|---|---|---|---|---|
| 170 | 600 | 0 | 1.76 | 0 | 0.01 | 260 | 2 | 11.8 | 6.85 | 6.1 |

Conversion for this example was calculated by determining the amount of second high molecular weight PPS product produced and dividing that by the sum of second slime and second high molecular weight PPS products, because the starting material was Feedstock One. Thus, percent conversion for Run 170, based on this described calculation, was 36.7%. As can be seen from these data, a larger the amount of second slime was produced, but the molecular weight of the high molecular weight PPS is much higher, as indicated by the lower melt flow index of the second high molecular weight PPS product produced.

Example 6

The purpose of this experiment was to determine if increasing the amount of NMP and water compared to the amount of Feedstock Three will change the melt flow index of the second high molecular weight PPS product produced. Table 6 shows the results of this experiment.

TABLE 6

| Run # | Feedstock Three (g) | NaOAc Added (moles) | H$_2$O Added (moles) | NMP Added (moles) | p-DCB Added (g) | Temp. (° C.) | Hold Time (hr) | Second Slime (g) | High Mol. Wt. PPS Produced (g) | Melt Index (g/10 min) | Conversion (%) |
|---|---|---|---|---|---|---|---|---|---|---|---|
| 180 | 21.43 | 0.25 | 1.586 | 4.756 (R) | 0 | 260 | 2 | 9.74 | 10.66 | 22 | 49.7 |
| 190 | 18.67 | 0.329 | 2.061 | 6.183 (R) | 0 | 260 | 2 | 7.57 | 7.5 | 19 | 40.6 |
| 290 | 21.43 | 0.25 | 1.586 | 4.756 (R) | 0 | 245 | 2 | 9.59 | 11.43 | 37 | 46.8 |
| 110 | 42.87 | 1 | 1.586 | 4.756 (R) | 0 | 260 | 2 | 9.44 | 34.48 | 330 | 80.0 |
| 240 | 42.87 | 0.25 | 1.586 | 4.756 (R) | 0 | 245 | 2 | 15.3 | 24.9 | 86 | 58.1 |

*(R) - Recycled NMP

In Runs 180, 190, and 290, the amounts of NMP and water were increased compared to the amount of Feedstock Three. As illustrated by the data, this decreased the melt flow index of the second high molecular weight PPS product produced. The melt flow index values for Runs 180, 190, and 290 were 22 g/10 min, 19 g/10 min, and 37.16 g/10 min as compared to 330 g/10 minute in Run 110 and 86 g/10 minutes in Run 240 where there was less water and NMP added to Feedstock Three. These experiments indicate that the larger the amount of the two phase recycle mixture, the higher the melt flow index of the second high molecular weight PPS product produced.

Example 7

The purpose of this experiment was to determine the effect of longer hold times at both 260° C. and 245° C. on the production of the second high molecular weight PPS product from Feedstock Three.

TABLE 7

| Run # | Feedstock Three (g) | NaOAc Added (moles) | $H_2O$ Added (moles) | NMP Added (moles) | p-DCB Added (g) | Temp. (° C.) | Hold Time (hr) | Second Slime (g) | High Mol. Wt. PPS Product Produced (g) | Melt Index (g/10 min) | Conversion (%) |
|---|---|---|---|---|---|---|---|---|---|---|---|
| 200 | 42.87 | 0.25 | 1.586 | 4.756 (R) | 0 | 260 | 6 | 13.36 | 26.77 | 150 | 62.4 |
| 210 | 42.87 | 0.25 | 1.586 | 4.756 (R) | 0 | 260 | 0.5 | 14.01 | 26.48 | 130 | 61.8 |
| 220 | 42.87 | 0.25 | 1.586 | 4.756 (R) | 0 | 260 | 0 | 14.64 | 26.15 | 160 | 61 |
| 260 | 42.87 | 0.25 | 1.586 | 4.756 (R) | 0 | 245 | 6 | 15.89 | 23.95 | 60 | 55.9 |
| 240 | 42.87 | 0.25 | 1.586 | 4.756 (R) | 0 | 245 | 2 | 15.3 | 24.9 | 86 | 58.1 |
| 250 | 42.87 | 0.25 | 1.586 | 4.756 (R) | 0 | 245 | 0 | 16.14 | 25.42 | 120 | 59.3 |

*(R) - Recycled NMP

As shown by each run above, there was not a significant difference in melt flow index values between hold times of about 2 to about 6 hours. However, as the time approached 0 hours, the melt flow index value increased as shown in Runs 220 and 250 where the melt flow index values were 160 grams/10 minutes and 120 grams/10 minutes respectively. Therefore, the most preferred hold times range from about 2 to about 6 hours.

Example 8

The purpose of this experiment was to determine the effect of temperature on the melt flow index of the second high molecular weight PPS produced from the two phase recycle mixture.

TABLE 8

| Run # | Feedstock Three (g) | NaOAc Added (moles) | $H_2O$ Added (moles) | NMP Added (moles) | p-DCB Added (g) | Temp. (° C.) | Hold Time (hr) | Second Slime (g) | High Mol. Wt. PPS Product Produced (g) | Melt Index (g/10 min) | Conversion (%) |
|---|---|---|---|---|---|---|---|---|---|---|---|
| 230 | 42.87 | 0.25 | 1.586 | 4.756 (R) | 0 | 270 | 2 | 16.73 | 22.77 | 250 | 53 |
| 240 | 42.87 | 0.25 | 1.586 | 4.756 (R) | 0 | 245 | 2 | 15.3 | 24.9 | 86 | 58.1 |
| 270 | 42.87 | 0.25 | 1.586 | 4.756 (R) | 0 | 235 | 2 | 42.49 | 0 | — | 0 |

At 270° C., the second high molecular weight PPS product produced had a high melt flow index, which shows that the second high molecular weight PPS product may be degrading at this temperature. At 235° C., no second high molecular weight PPS product was produced. Therefore, these data indicate that temperatures ranging from about 240° C. to about 265° C. is preferred since larger amounts of the second high molecular weight PPS product is produced.

While this invention has been described in detail for the purpose of illustration, it is not to be construed or limited thereby. This detailed description is intended to cover all changes and modifications within the spirit and scope thereof.

That which is claimed is:

1. A process comprising:
   1) removing a majority of a first high molecular weight poly(arylene sulfide) product from a polymerization reaction mixture and recovering a recycle mixture;
      wherein said polymerization reaction mixture comprises said first high molecular weight poly(arylene sulfide) product, low molecular weight poly(arylene sulfide), cyclic and linear poly(arylene sulfide) oligomers, at least one first polar organic compound, at least one first promoter compound, an alkali metal by-product, reactants, and water;
      wherein said recycle mixture comprises:
      (a) low molecular weight poly(arylene sulfide);
      (b) cyclic poly(arylene sulfide) oligomers of the formula

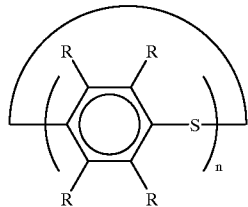

where $4 \leq n \leq 30$;
      (c) linear poly(arylene sulfide) oligomers of the formula

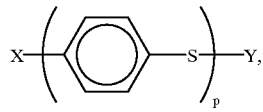

where $1 \leq p \leq 50$, and X and Y are independently selected from the group consisting of a hydrogen atom; a halogen atom; a phenoxy group; a halogenated phenyl group; a hydroxy group and the salts thereof; a cyclic amide; mercaptan groups and the salts thereof; substituted and unsubstituted amines of the formula

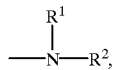

where $R^1$ and $R^2$ are selected from the group consisting of a hydrogen atom, an alkyl group having from 1 to 10 carbon atoms, a carboxylic acid having from 1 to 10 carbon atoms and a carboxylate having from 1 to 10 carbon atoms;
   2) forming a two phase recycle mixture by a method selected from the group consisting of maintaining sufficient first polar organic compound and first promoter compound in said recycle mixture or adding sufficient second polar organic compound and second promoter compound to said recycle mixture;
   3) heating said two phase recycle mixture to produce a recycle product reaction mixture;
   4) recovering a second high molecular weight poly (arylene sulfide) product from said recycle product reaction mixture.

2. A process according to claim 1 wherein said recycle mixture is prepared by a process comprising:
   1) lowering the temperature of said polymerization reaction mixture to solidify said high molecular weight P(AS) product, said low molecular weight P(AS), and cyclic and linear P(AS) oligomers;
   2) removing said high molecular weight P(AS) product and recovering said low molecular weight P(AS) and cyclic and linear P(AS) oligomers to be utilized as said recycle mixture.

3. A process according to claim 1 wherein said recycle mixture is prepared by a process comprising:
   1) forming a two phase polymerization reaction mixture by a method selected from the group consisting of a) maintaining sufficient first polar organic compound and first promoter compound in said polymerization reaction mixture and b) adding sufficient second polar organic compound and second promoter compound to said polymerization reaction mixture;
   wherein said two phase polymerization reaction mixture comprises a more dense polymer-rich liquid phase and a less dense polymer-lean liquid phase;
   wherein said more dense polymer-rich liquid phase comprises essentially all of the high molecular weight P(AS) product and a portion of said lower molecular weight P(AS) and cyclic and linear P(AS) oligomers;
   wherein said less dense polymer-lean liquid phase comprises the remainder of the lower molecular weight P(AS) and cyclic and linear P(AS) oligomers;
   2) recovering said polymer-lean liquid phase to be utilized as said recycle mixture.

4. A process according to claim 1 wherein said first polar organic compound and said second polar organic compound are independently selected from the group consisting of 1,3 dimethyl-2-imidazolidinone, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and mixtures thereof.

5. A process according to claim 4 wherein said first polar organic compound or said second polar organic compound is N-methyl-2-pyrrolidone.

6. A process according to claim 1 wherein said first promoter compound and said second promoter compound are alkali metal carboxylates and are independently selected from the group consisting of lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof.

7. A process according to claim 6 wherein said first promoter compound or said second promoter compound is sodium acetate.

8. A process according to claim 1 wherein said first promoter compound or said second promoter compound is lithium chloride.

9. A process according to claim 1 wherein there is a substantial absence of added dihalogenated aromatic compounds in said recycle mixture.

10. A process according to claim 1 wherein there is a substantial absence of an added sulfur source in said recycle mixture.

11. A process according to claim 1 wherein said recycle mixture comprises low molecular weight poly(arylene sulfide) having extrusion rates and melt flow rates which are at least 50% greater than those of said first high molecular weight poly(arylene sulfide) product from which it was removed.

12. A process according to claim 1 wherein said recycle mixture further comprises at least one other component selected from the group consisting of said first polar organic compounds, said first promoter compounds, dihalogenated aromatic compounds, alkali metal halide by-product, and various contaminants introduced during a poly(arylene sulfide) polymerization or recovery.

13. A process according to claim 1 wherein the amount of said first polar organic compound maintained in said recycle mixture or the amount of said second polar organic compound added to the recycle mixture ranges from about 2 moles to about 25 moles of said first and/or second polar organic compounds per mole of sulfur in the high molecular weight poly(arylene sulfide) product.

14. A process according to claim 13 wherein said first promoter compound or said second promoter compound is water with the amount added or maintained in said recycle mixture ranging from about 0.2 to about 10 moles of water per mole of sulfur in the high molecular weight poly(arylene sulfide) product.

15. A process according to claim 13 wherein said promoter compound is an alkali metal carboxylate promoter with the amount added or maintained in said recycle mixture ranging from about 0.01 to about 2 moles of alkali metal carboxylate promoter compound per mole of sulfur in the high molecular weight poly(arylene sulfide) product.

16. A process according to claim 1 wherein said forming a two phase recycle mixture is conducted at a temperature in the range of 220° C. to 270° C.

17. A process according to claim 1 wherein said two phase recycle mixture is heated to a temperature in a range of 240° C. to 265° C.

18. A process according to claim 15 wherein said two phase recycle mixture is heated to a temperature in a range of 240° C. to 265° C. for a time in a range of about 2 hours to about 6 hours.

19. A process according to claim 1 wherein no dihalogenated aromatic compound is added.

20. A process according to claim 1 wherein no sulfur source is added.

21. A process consisting essentially of:
1) removing a majority of a first high molecular weight poly(arylene sulfide) product from a polymerization reaction mixture and recovering a recycle mixture;
    wherein said polymerization reaction mixture comprises said first high molecular weight poly(arylene sulfide) product, low molecular weight poly(arylene sulfide), cyclic and linear poly(arylene sulfide) oligomers, at least one first polar organic compound, at least one first promoter compound, an alkali metal by-product, reactants, and water;
    wherein said recycle mixture comprises:
        (a) low molecular weight poly(arylene sulfide);
        (b) cyclic poly(arylene sulfide) oligomers of the formula

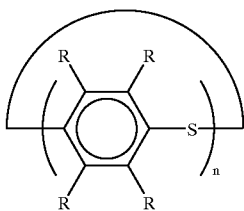

where $4 \leq n \leq 30$;
        (c) linear poly(arylene sulfide) oligomers of the formula

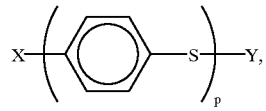

where $1 \leq p \leq 50$, and X and Y are independently selected from the group consisting of a hydrogen atom; a halogen atom; a phenoxy group; a halogenated phenyl group; a hydroxy group and the salts thereof; a cyclic amide; mercaptan groups and the salts thereof; substituted and unsubstituted amines of the formula

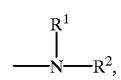

where $R^1$ and $R^2$ are selected from the group consisting of a hydrogen atom, an alkyl group having from 1 to 10 carbon atoms, a carboxylic acid having from 1 to 10 carbon atoms and a carboxylate having from 1 to 10 carbon atoms;
    wherein there is a substantial absence of an added dihalogenated aromatic compound and an added sulfur source;
2) forming a two phase recycle mixture by a method selected from the group consisting of maintaining about 2 to about 25 moles of N-methyl-2-pyrrolidone per mole of sulfur in the high molecular weight poly (arylene sulfide) product and about 0.01 to about 2 moles of sodium acetate per mole of sulfur in the high molecular weight poly(arylene sulfide) product and adding about 2 to about 25 moles of N-methyl-2-pyrrolidone per mole of sulfur in the high molecular weight poly(arylene sulfide) product and about 0.01 to about 2 moles of sodium acetate per mole of sulfur in the high molecular weight poly(arylene sulfide) product to said recycle mixture;
    wherein the amount of N-methyl-2-pyrrolidone and sodium acetate are sufficient to allow the low molecular weight poly(arylene sulfide) and cyclic and linear poly(arylene sulfide) oligomers to dissolve;
3) heating said two phase recycle mixture to a temperature in a range of about 240° C. to about 265° C. for a time of about 2 hours to about 6 hours to produce a recycle product reaction mixture; and
4) recovering a second high molecular weight poly (arylene sulfide) product from said recycle product reaction mixture.

22. A poly(arylene sulfide) produced by the process of claim 1.

23. A poly(arylene sulfide) produced by the process of claim 19.

* * * * *